(12) United States Patent
Fang et al.

(10) Patent No.: US 10,001,218 B2
(45) Date of Patent: Jun. 19, 2018

(54) HINGED VALVE

(71) Applicant: SHANGHAI HONGYAN RETURNABLE TRANSIT PACKAGINGS CO., LTD, Shanghai (CN)

(72) Inventors: Zhengwei Fang, Shanghai (CN); Zuocheng Qian, Shanghai (CN)

(73) Assignee: Shanghai Hongyan Returnable Transit Packagings Co., Ltd., Shanghai (CN)

( * ) Notice: Subject to any disclaimer, the term of this patent is extended or adjusted under 35 U.S.C. 154(b) by 174 days.

(21) Appl. No.: 14/907,498

(22) PCT Filed: Jul. 24, 2014

(86) PCT No.: PCT/CN2014/082907
§ 371 (c)(1),
(2) Date: Mar. 11, 2016

(87) PCT Pub. No.: WO2015/010635
PCT Pub. Date: Jan. 29, 2015

(65) Prior Publication Data
US 2016/0230895 A1    Aug. 11, 2016

(30) Foreign Application Priority Data

Jul. 24, 2013   (CN) .......................... 2013 1 0314940

(51) Int. Cl.
*F16K 1/20* (2006.01)
*F16K 27/02* (2006.01)
(Continued)

(52) U.S. Cl.
CPC ........ *F16K 1/2007* (2013.01); *F16K 27/0227* (2013.01); *F16K 31/521* (2013.01); *F16K 31/52441* (2013.01); *Y10T 137/0525* (2015.04)

(58) Field of Classification Search
CPC ........ F16K 1/20; F16K 1/2007; F16K 1/2014; F16K 1/523; F16K 27/0227;
(Continued)

(56) References Cited

U.S. PATENT DOCUMENTS 3,084,904 A * 4/1963 McGay ................ F16K 1/2028
251/218
2003/0164191 A1   9/2003 Lonardi et al.

FOREIGN PATENT DOCUMENTS

| CN | 1298070 | 6/2001 |
| CN | 2929383 | 8/2007 |

(Continued)

OTHER PUBLICATIONS

International Search Report for international application No. PCT/CN2014/082907, dated Dec. 9, 2014 (4 pages).

*Primary Examiner* — Mary McManmon
*Assistant Examiner* — Hailey K Do
(74) *Attorney, Agent, or Firm* — Hamre, Schumann, Mueller & Larson, P.C.

(57) ABSTRACT

The present invention provides a hinged valve, comprising a handle, a valve body, a valve stem, a valve core, sealing rings, guide and a valve cover. The valve core is connected to the valve body by means of a hinge such that the valve core will be rotated around a rotation axis of the hinge. A locking hook and a positioning hole are provided on the valve stem. A positioning column, elastic buckles and guiding slot are provided on the guide. The positioning column is connected to the positioning hole of the valve stem and the guide is elastically assembled to the body of the valve stem under the effect of the elastic buckles of the guide, such that the guide and the valve stem will move synchronously without motion relative to each other. Rotating shafts and a guiding post are provided. The rotating shafts are rotatably connected to the connecting holes. The guiding post can (Continued)

move along the guiding slot in the guide such that the rotation of the valve stem will be transferred to the valve core via the slide by the guide and is converted into a rotation of the valve core around the rotation axis of the hinge so as to open or close the valve The valve of the present invention is structurally compact, easy to operate, open with a small torque, opened at a large angle, and allows for a large flow.

9 Claims, 10 Drawing Sheets

(51) Int. Cl.
  *F16K 31/524* (2006.01)
  *F16K 31/52* (2006.01)
(58) Field of Classification Search
  CPC ............ F16K 31/52441; F16K 31/521; F16K 31/563; Y10T 137/0525

USPC ........................ 251/251, 228, 292, 298, 308
  See application file for complete search history.

(56) References Cited

FOREIGN PATENT DOCUMENTS

| CN | 102979925 | 3/2013 | | |
|----|-----------|--------|---|---|
| CN | 103090023 | 5/2013 | | |
| CN | 103363127 | 10/2013 | | |
| CN | 203453486 | 2/2014 | | |
| GB | 969349 A | * | 9/1964 | ............. F16K 1/523 |
| WO | 03100302 | 5/2003 | | |
| WO | 2007019560 | 2/2007 | | |
| WO | 2010120968 | 10/2010 | | |

* cited by examiner

HINGED VALVE

TECHNICAL FIELD

The present invention relates to valves, in particular to valves used in IBC.

BACKGROUND

Current valves used in IBC, such as butterfly valves, are opened through rotating the central rotating shaft, which drives the two sides of the valve core to be opened. Since the valve core is generally located within the interior of the valve body, the flow will be affected by the valve core and the rotating shaft. Further, current valves have poor sealing performances. In addition, the force required to open/close the valve is huge due to the friction between the sealing ring and the valve body of the butterfly valves.

There has recently developed a guide slot lifting rod ball valve at domestic and abroad. There provided on the valve stem a S-shaped guide slot, which is engaged with the guide pin, so that when the valve stem rises, it causes the ball to disengage from the valve seat. Then, the valve stem further rotates 90° counterclockwise and fully open the valve. When the valve stem is moving down, the ball rotates 90° clockwise, then being pressed towards the valve seat to close the valve. The shortcomings of the technology is that a long S-shaped guide slot being provided on the valve stem, thus, when the valve rotates for opening or closing, the valve stem needs to move up and down spirally along the guide slot, resulting in a huge space for the guide slot and a large rotation angle and other shortcomings.

Chinese Patent Application No. 99124192.4 has disclosed a structure for opening and closing a valve, which is a disk-shaped two-track rotary with deploy-close structure. The structure comprises a fixed disk, a rotating disk and a stop pin. When the external force drives the valve stem together with the rotating disk to move the stop pin, the stop pin rotates clockwise along the "arc" track of the fixed disk. When rotated to the "straight" track connected to the "arc" rail track, the rotating disk rotates clockwise further, and the stop pin deploys the surrounding of the fixed disk along the "straight" track of the fixed disk under the forced action by the "deploy-close" track of the rotating disk. At this time, the stop pin structure together with the valve sealing structure close to the valve seat, thus close the valve. When the valve rotates counter-clockwise together with the rotating disk, the stop pin together with the sealing structure move towards the centre of the fixed disk along the "straight" track of the fixed disk under the forced action by the "deploy-close" track of the rotating disk, and then rotate counter-clockwise along the "arc" track of the fixed disk to open the valve. The technical shortcoming of the patent is to use the "arc connected with straight line" track, which requires high precision and complex processing. Further, since the valve cartridge is a combined sphere, it is difficult to get a balanced preload force, resulting in damage to the valve cartridge and shortening the life of the valve.

Chinese Patent No. 200620105067 has disclosed an orbit plug valve, comprising a valve body, a valve cover, an operating member, a valve stem, a valve seat, a valve plug which together with the valve seat forming a conical surface sealing, and an orbital mechanism. The orbital mechanism comprises a track with two guide slots mounting on the neck portion of the valve plug and a plate with two guide pins inserting into said guide slots, as well as a lock nut and an adjusting ring for adjusting the mounting position of the track. The shortcomings of the present patent are that the transmission device structure is complex, and extremely occupy the external space of the valve body. Further the transmission device involves more parts, resulting in complicated assembly process. In addition, since the valve has a plug forming a cone surface sealing as well as a lock nut and an adjusting ring for adjusting the mounting position of the track, it must be adjusted several times, resulting in complex operation.

SUMMARY

The object of the present invention is to provide a valve having a compact structure, being easy to operate, requiring a small torque for opening, opened at a large angle, allowing for a large flow when opened, and easy to be cleaned.

In order to achieve the aim, the invention provides a hinged valve, comprising a handle, a valve body, a valve stem, a valve core, sealing rings and a valve cover, said valve body is a housing, wherein the housing is formed with a valve stein hole for partially accommodating the valve stem, and a channel having an inlet and an outlet is formed in the housing, wherein the hinged valve further comprises a guide and a slide for transferring the motion of the valve stem to the valve core;

the valve core is connected to the valve body by means of a hinge such that the valve core can be rotated around a rotation axis of the hinge, wherein a locking column and connecting holes are provided on the valve core;

a locking hook is provided on the bottom end of the valve stem;

a guiding structure is provided on the guide, wherein the guide and the valve stein are connected to each other so as to move synchronously without motion relative to each other; and rotating shafts and another guiding structure for engaging with the guiding structure of the guide are provided on the slide, wherein the rotating shafts are respectively connected to the connecting holes and rotatable in the connecting holes such that the rotation of the valve stein will be transferred to the valve core via the slide by the guide and is converted into a rotation of the valve core around the rotation axis of the hinge so as to open or close the valve, and wherein the valve core is locked to the valve body through the locking hook and the locking column when the valve is closed.

According to a preferred embodiment, the guiding structure of the guide is a guiding slot, and the another guiding structure of the slide is a guiding post, wherein the guiding post is slidable along the guiding slot.

According to another preferred embodiment, the guide is further provided with a positioning column and elastic buckles, and a positioning hole is provided on the lower portion of the valve stem above the locking hook, wherein the positioning column on the guide is connected to the positioning hole of the valve stem and the guide is elastically assembled to the body of the valve stem under the effect of the elastic buckles of the guide, such that the guide and the valve stem will move synchronously without motion relative to each other.

According to another preferred embodiment, the guide and the valve stem are formed integrally.

According to another preferred embodiment, the hinge is constructed of hinge shafts provided on the valve core and hinge holes provided on the valve body.

According to another preferred embodiment, the locking hook is a hook-shaped structure and comprises an start portion, an intermediate portion and a terminal portion, wherein the start portion is an inclined surface functioning as a guider.

According to another preferred embodiment, two positioning protrusions spaced apart by an angle are provided on the outer wall defining the valve stem hole, and a stopping projection and locking protrusions are integrally protruding from the outer wall of the valve stem at the upper portion thereof, wherein the stopping projection and locking protrusions are respectively engaged with the two positioning protrusions so as to keep the valve open and prevent the valve stem from rotating beyond a predetermined angle.

According to another preferred embodiment, the valve core has a disc-shaped body and the locking column is provided at a side of the body facing toward the channel, wherein two projections above the locking column are protruded from the side of the valve core, wherein connecting holes for receiving the rotating shafts of the slide are provided in the two projections, respectively.

According to another preferred embodiment, the guide is an E-shaped member, wherein the elastic buckles are the upper and lower arms of the E-shaped member and the positioning column is the middle arm of the E-shaped member, wherein the guiding slot is provided on the head of the E-shaped member, wherein a positioning step is further provided below the positioning hole, which prevents the guide from moving in the axial direction of the valve stem.

According to another preferred embodiment, the slide has a substantially U-shaped body, wherein the rotating shafts are provided on the ends of two arms of the U-shaped body, respectively.

In the valve of the present invention, since the valve core is connected to the valve body via a hinge, the valve core can be rotated around the central axis of the hinge to achieve opening/closing of the valve. When opened, there is no stopping member in the fluid channel of the valve body, which allows for a large flow. Further, adopting a hinge connecting manner provides a valve with simple, compact structure and a low manufacturing cost, being easy to operate, requiring a small torque for opening/closing, opened at a large angle, allowing for a large flow, and easy to be cleaned.

DETAILED DESCRIPTION

Figure 1:
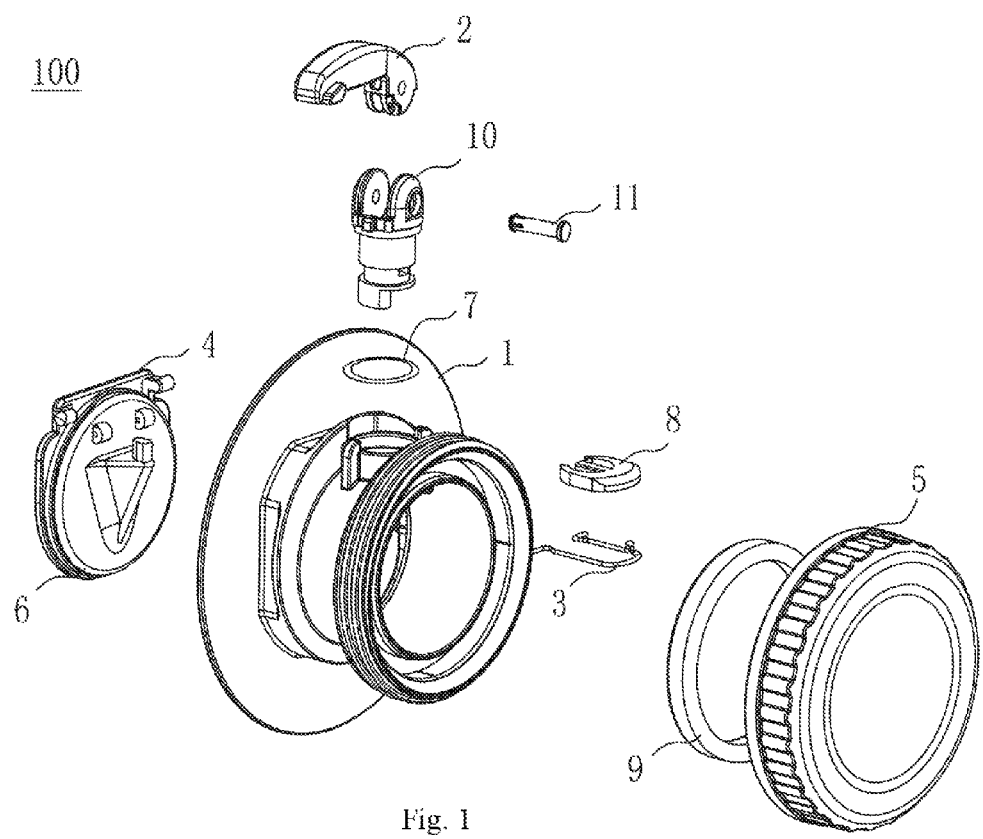
FIG. 1 shows an exploded perspective view of a hinged valve according to the first embodiment of the present invention.

The preferred embodiments of the invention will be described in detail with the reference to the drawing in the following, in order to more clearly understand the purpose, the features and advantages of the present invention. It should be understood that the embodiments shown in the drawings are not to limit the scope of the invention, but merely to illustrate the substantive spirit of the technical solution of the present invention.

FIG. 1 shows an exploded perspective view of a hinged valve 100 according to the first embodiment of the present invention. As shown in FIG. 1, the valve 100 comprise a valve body 1, a handle 2, a slide 3, a valve core 4, a valve cover 5, sealing rings 6, 7 and 9, a guide 8, a valve stem 10 and a handle pin 11. The valve core 4 is connected to the valve body 1 by means of a hinge. The hinge is constructed of hinge shafts provided on the valve core 4 and hinge holes provided on the valve body 1, which will be described in more detail hereafter. The sealing ring 6 is located between the valve core 4 and the valve body 1. The handle 2 is connected to the valve stem 10 via the handle pin 11. The valve stem 2 is connected to the valve core 4 via the guide 8 and the slide 3. The guide 8 and the slide 3 act as motion-transferring means for transferring motion of the valve stem to the valve core such that the handle 2 drive the valve stem to rotate when the handle 2 is rotated which in turn drive the guide 8 and the slide 3 to move. The slide 3 in turn drives the valve core 4 to move, thereby achieving opening/closing of the valve. The sealing ring 7 is arranged between the valve stem 10 and the valve body 1. The sealing ring 9 is located between the valve body 1 and the valve cover 5.

The valve stem 10 is further provided with a locking hook. A locking column is provided on the valve core. The valve core is locked to the valve body via the locking hook and the locking column so as to close the valve hermetically, which will be described further hereafter.

Figure 2A:
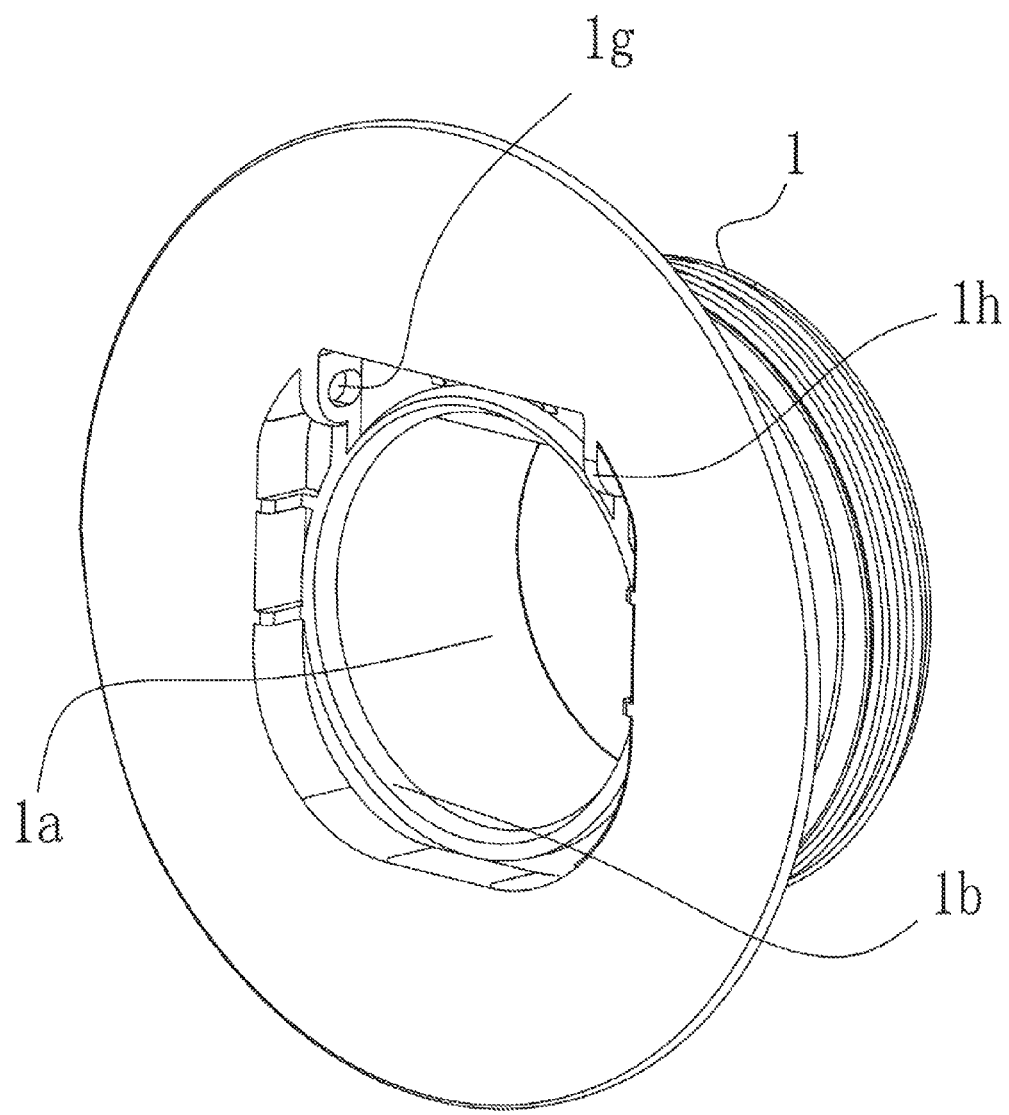
FIG. 2a shows a perspective view of a valve body of the valve according to the first embodiment of the present invention.
Figure 2B:
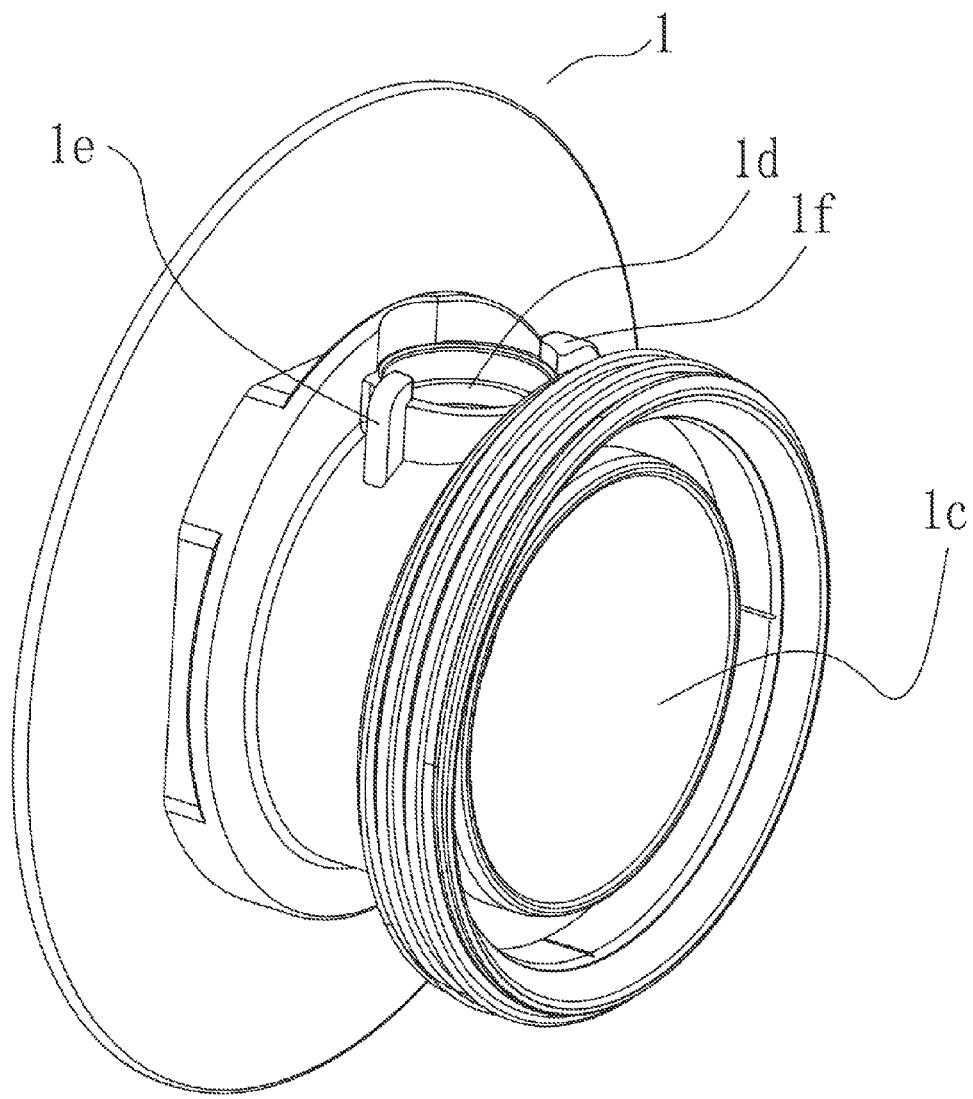
FIG. 2b shows another perspective view of the valve body of the valve according to the first embodiment of the present invention.

FIGS. 2a-2b show perspective views of a valve body 1 of the valve 100 according to the first embodiment of the present invention. As shown in FIGS. 2a-2b, the valve body 1 is a housing, in which a channel 1a is formed allowing for the passage of fluid. An inlet 1b to be communicated with a container and an outlet 1c to be communicated with external environment are respectively formed on the left and right ends of the housing along a horizontal axis (not shown). The valve core 4 is provided at the inlet 1b. The outlet 1c is connected with the valve cover. A valve stem hole 1d is formed at the upper end of the valve body 1 and extends along a vertical axis (not shown) perpendicular to said horizontal axis. Positioning protrusions 1e and 1f separated by a degree are provided on an outer wall defining the valve stem hole 1d. The hinge holes 1g and 1h are provided on the valve body above the channel 1a at the inlet 1b of the valve body 1.

Figure 3A:
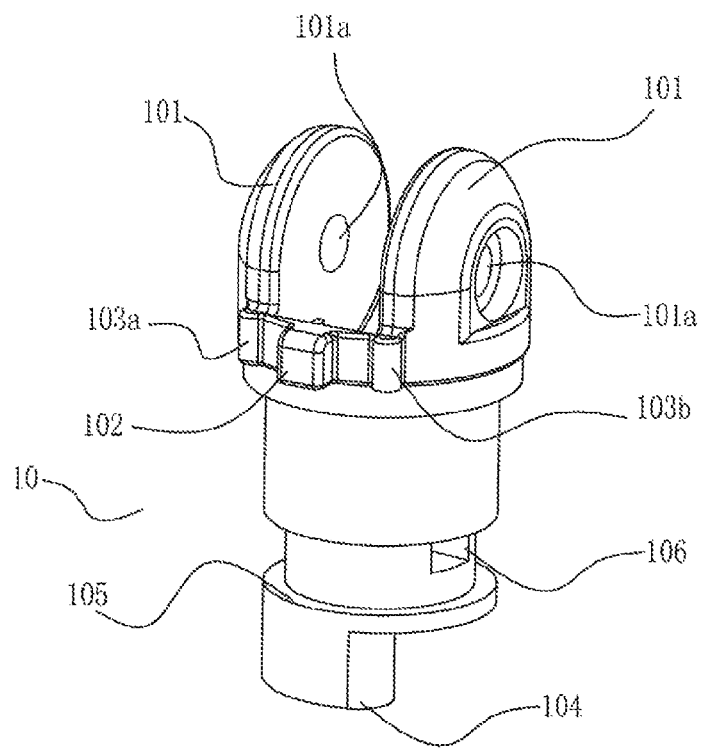
FIG. 3a shows a perspective view of a valve stem of the valve according to the first embodiment of the present invention.
Figure 3B:
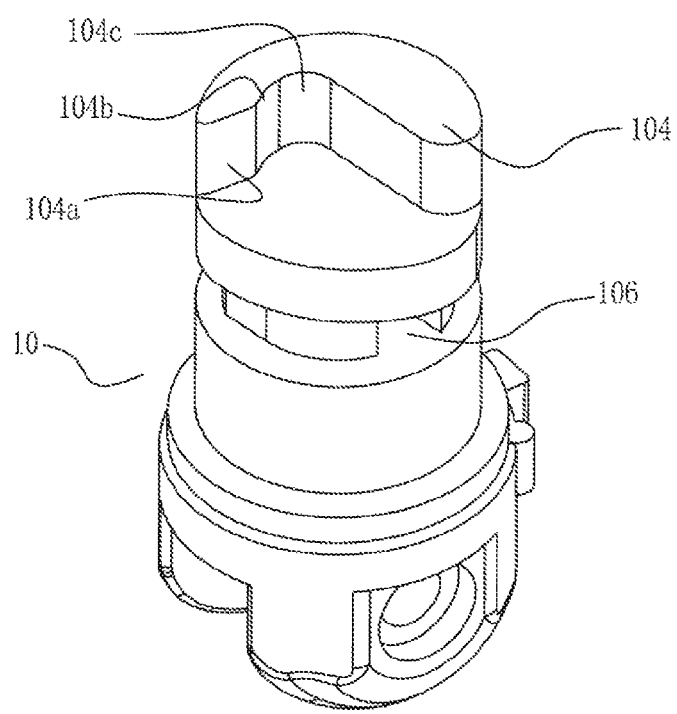
FIG. 3b shows another perspective view of the valve stem of the valve according to the first embodiment of the present invention.

FIGS. 3a-3b show the perspective views of the valve stem 10 of the valve 100. The valve stem 10 are partially accommodated in the valve stem hole 1d. Two lugs 101 are formed on the top of the valve stem. The lugs 101 are provided with pin holes 101a. The lugs and the pin holes thereon are engaged with the handle 2 and the handle pins 11, respectively. A stopping projection 102 and locking protrusions 103a, 103b are integrally protruding from the outer wall of the valve stem at the upper portion thereof. The stopping projection 102 and locking protrusions 103a, 103b are respectively engaged with the positioning protrusions 1e, 1f on the valve body 1, so as to keep the valve in an open state and prevent the valve stem from rotating beyond a predetermined angle.

A locking hook 104 is integrally provided at the bottom end of the valve stem 10. The locking hook 104 is used to maintain the valve core 4 in a stably closed state while the valve is closed. The locking hook 104 is a hook-shaped structure and comprises an start portion 104a, an intermediate portion 104b and a terminal portion 104c, wherein the start portion 104a is an inclined surface functioning as a guider. The locking hook is used to be engaged with a locking column provided on the valve core 4, so as to achieve locking when the valve is closed, which will be described in more detail hereinafter.

A positioning step 105 and a radial positioning hole 106 are provided at the middle portion or lower portion of the valve stem 10. The positioning step 105 and the positioning hole 106 are engaged with the guide 8 such that the guide 8 is retained on the valve stem 10 and the guide 8 will not be disengaged from the valve stem 10 when assembled unless being removed manually, which will be described in more detail hereinafter.

Figure 4A:
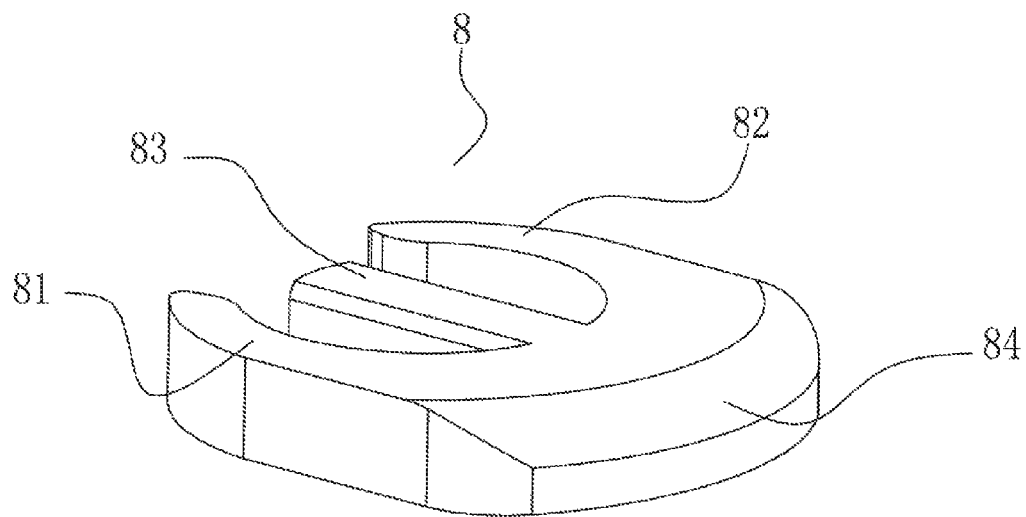
FIG. 4a shows a perspective view of a guide of the valve according to the first embodiment of the present invention.
Figure 4B:
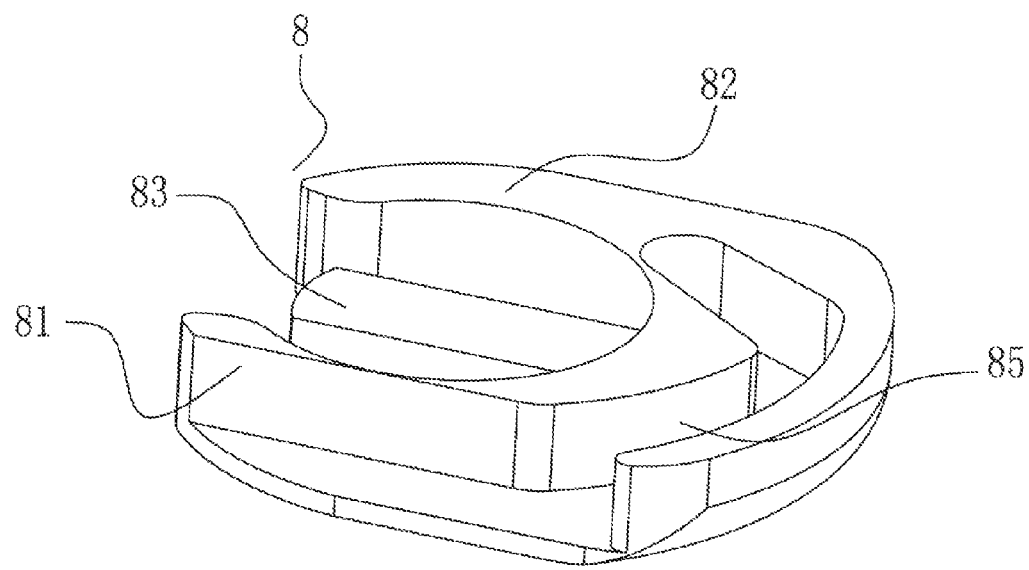
FIG. 4b shows another perspective view of the guide of the valve according to the first embodiment of the present invention.

FIGS. 4a and 4b show perspective view of the guide 8 of the valve 100, wherein FIG. 4a shows the front of the guide 8 and FIG. 4b shows the back of the guide 8. The guide 8 is provided with a positioning column, elastic buckles and guiding slot. The positioning column and elastic buckles are engaged with the valve stem, and the guiding slot is engaged with the slide so as to transfer a motion. As shown in FIGS. 4a and 4b, the guide 8 is a substantially E-shaped member. The upper and lower arms 81, 82 of the E-shaped member are elastic such that the guide 8 will not be disengaged from the positioning hole 106 when the middle arm (ie. positioning column) 83 of the guide 8 is inserted into the positioning hole 106 unless being removed manually. Particularly, the positioning step 105 of the valve stem 10 will prevent the guide 8 from moving in the axial direction of the valve stem. When the elastic buckle 81, 82 of the guide 8 is assembled, there is a resilient force which causes the guide 8 to hug the valve stem 10 and prevents the guide 8 from dropping. The guide 8 will be rotated along with the valve stem synchronously when the valve stem is rotated. The guide 8 will be removed when the force acting on the guide is larger that the elastic force of the elastic buckle.

A guiding slot is provided on the head 84 (ie. head of the E-shaped member, that is, the vertical part of the E-shaped member) of the guide 8. The guiding slot 85 has a shape such that when the valve is assembled, a guiding post 33 of the slide (see FIG. 5) may slide along the guiding slot 85 and drive the valve core to be opened or closed under the interaction between the guiding slot 85 and the guiding post 33.

Figure 5:
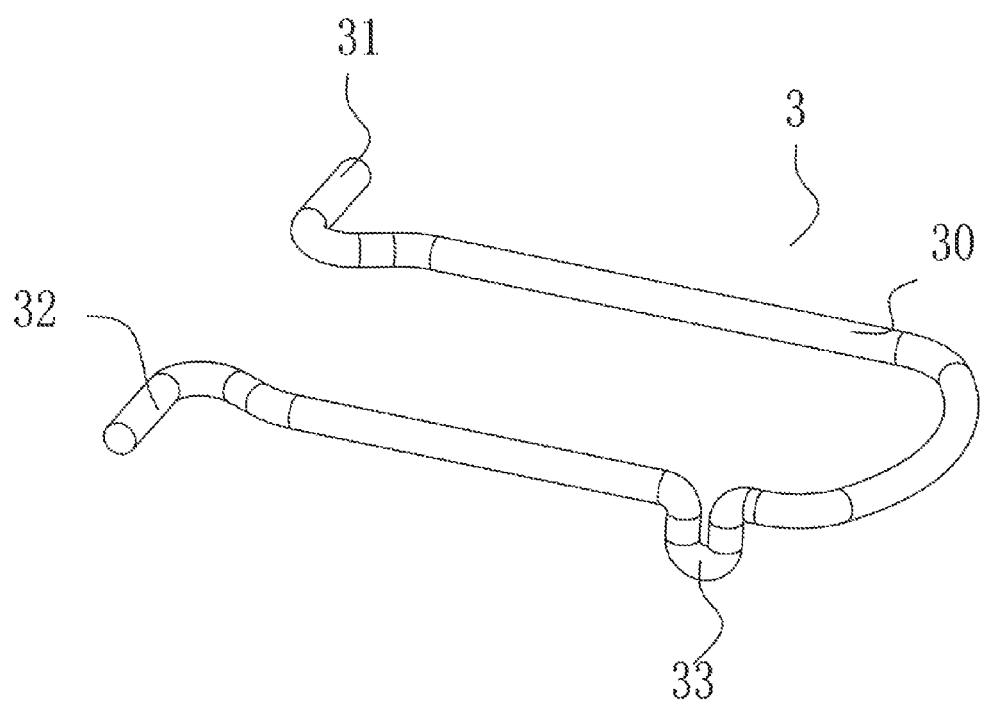
FIG. 5 shows a perspective view of a slider of the valve according to the first embodiment of the present invention.

FIG. 5 shows a perspective view of a slide 3 of the valve according to the first embodiment of the present invention. As shown in FIG. 5, the slide 3 has a substantially U-shaped body 30. The ends of two arms of the body 30 are provided with two rotating shafts 31, 32, respectively. The slider 3 is also provided with a guiding post 33. The guiding post 33 is located at a suitable position of the U-shaped body 30, so that the guiding post 33 may move within the guiding slot 85 of guide 85. In this embodiment, the slider 3 is elastic. The rotating shafts 31 are straight segments with a length. The angle between the rotating shafts and the body 30 is fixed and is typically 90°. The rotating shafts 31, 32 are inserted into the connecting holes 45, 46 on the valve core 4, respectively, which will be described in more detail below. The rotating shafts 31, 32 are hinged to the connecting holes 44 and are rotatable in the connecting holes. Thus, the rotation of the valve stem 10 can drive the slider 3 to move in the guide 8, so that the rotational movement of the valve stem is transmitted to the valve core via the slide 3 and the guide 8 and is converted into a rotation of the valve core around the rotation axis of the hinge so as to open or close the valve, as will be further described hereafter.

Figure 6:
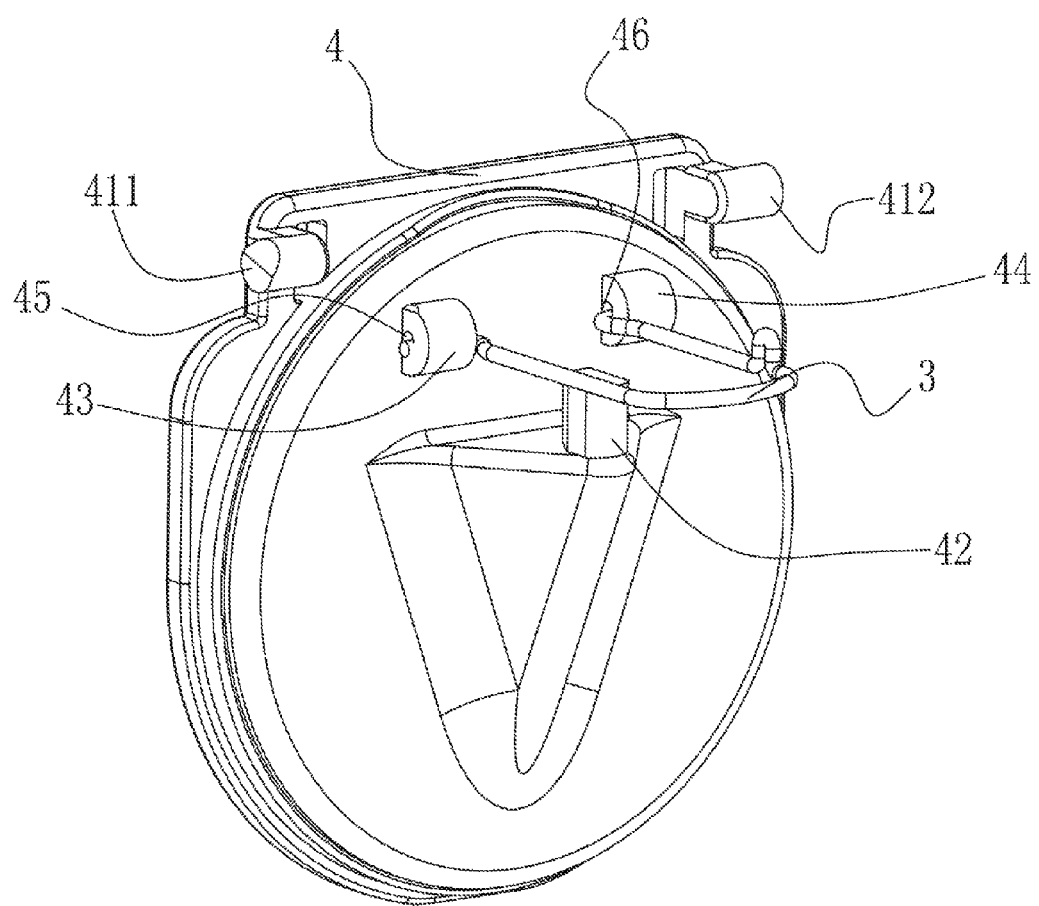
FIG. 6 shows a partial perspective view of a valve core with the slider installed thereon of the valve according to the first embodiment of the present invention.

FIG. 6 shows a perspective view of a valve core with the slider installed thereon of the valve according to the first embodiment of the present invention. As shown in FIG. 6, the valve core 4 has a disc-shaped body 41. The outer periphery of the body 41 is integrally provided with hinge shafts 411, 412. A locking column 42 is provided at a side of the body 41 facing towards the channel 1a of the valve body 41. The locking column 42 is used to engaged with the locking hook 104 of the valve stem 10 such that there is an interference fit between the locking column 42 and the locking hook 104 when locked. Two projections 43 and 44 above the locking column 42 are protruded from the side of the valve core. Connecting holes 45, 46 for receiving the rotating shafts of the slide 3 are provided in the projections 43 and 44, respectively.

When assembled, the valve stem 10 is partially housed in the valve stem hole 1d of the valve body 1. The guide 8 is inserted into the positioning hole 106 on the valve stem. The guiding post 33 on the slide 3 is inserted into the guiding slot 85 of the guide 8. The guiding post 33 can only move along the guiding slot 85 and will not be disengaged from it. Hinge shafts on the valve core 4 are installed in the hinge holes on the body, respectively. The rotating shafts 31, 32 on the slide 3 are inserted into the connecting holes 45, 46 on the valve core 4, respectively. The slide 3 will not be disengaged from the valve when assembled unless being detached manually since the slide is elastic.

Figure 7:
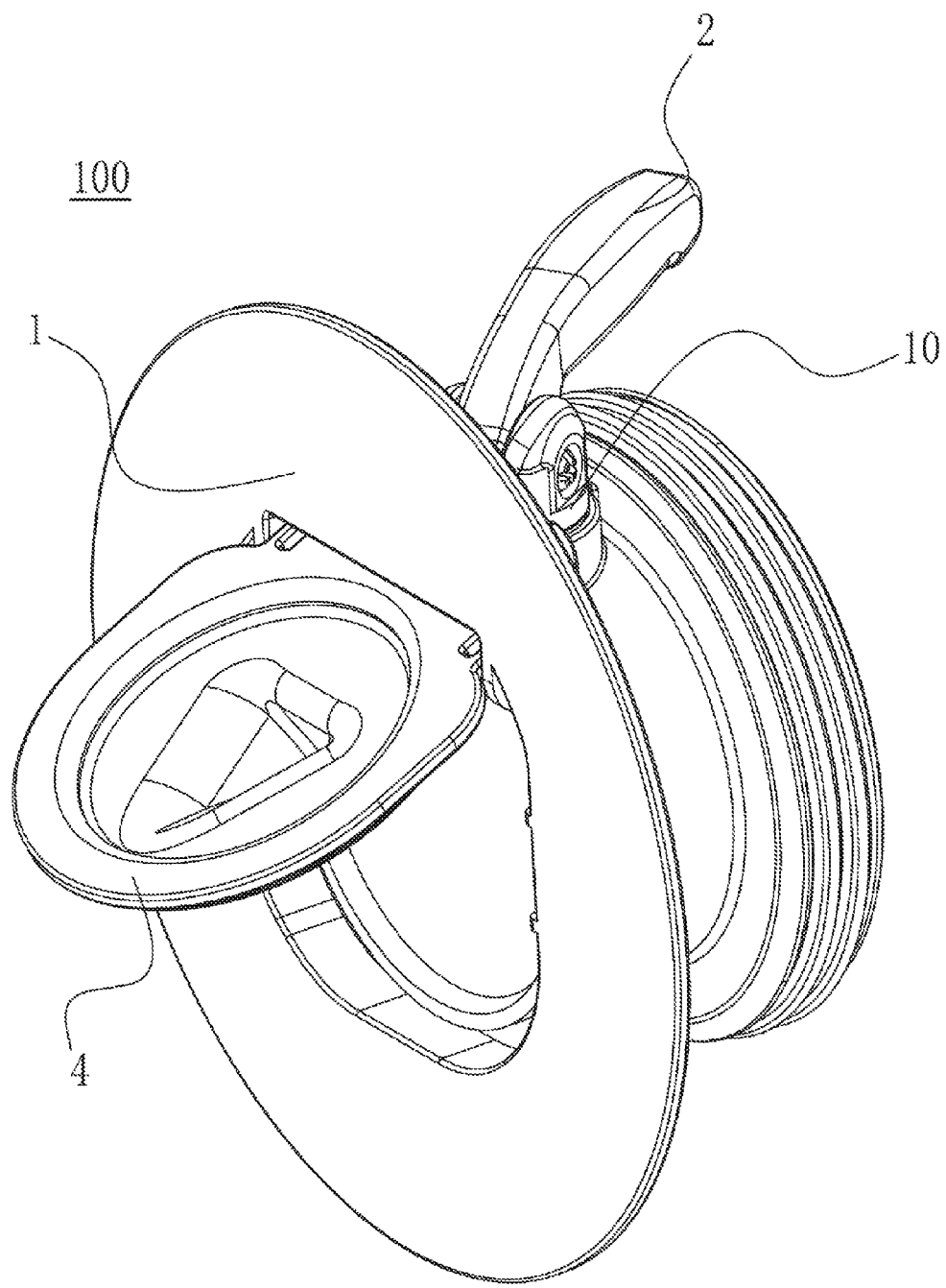
FIG. 7 shows a perspective view of the valve when assembled according to the first embodiment of the present invention, wherein the valve is opened.

FIG. 7 shows a perspective view of the valve when assembled, wherein the valve is opened. The rotation of the valve stem 10 will drive the guide 8 to rotate when assembled. The guide 8 drives the slide 3 through the engagement between the guiding slot 85 and the guiding post 33, which in turn drives the valve core to be opened or closed.

Figure 8:
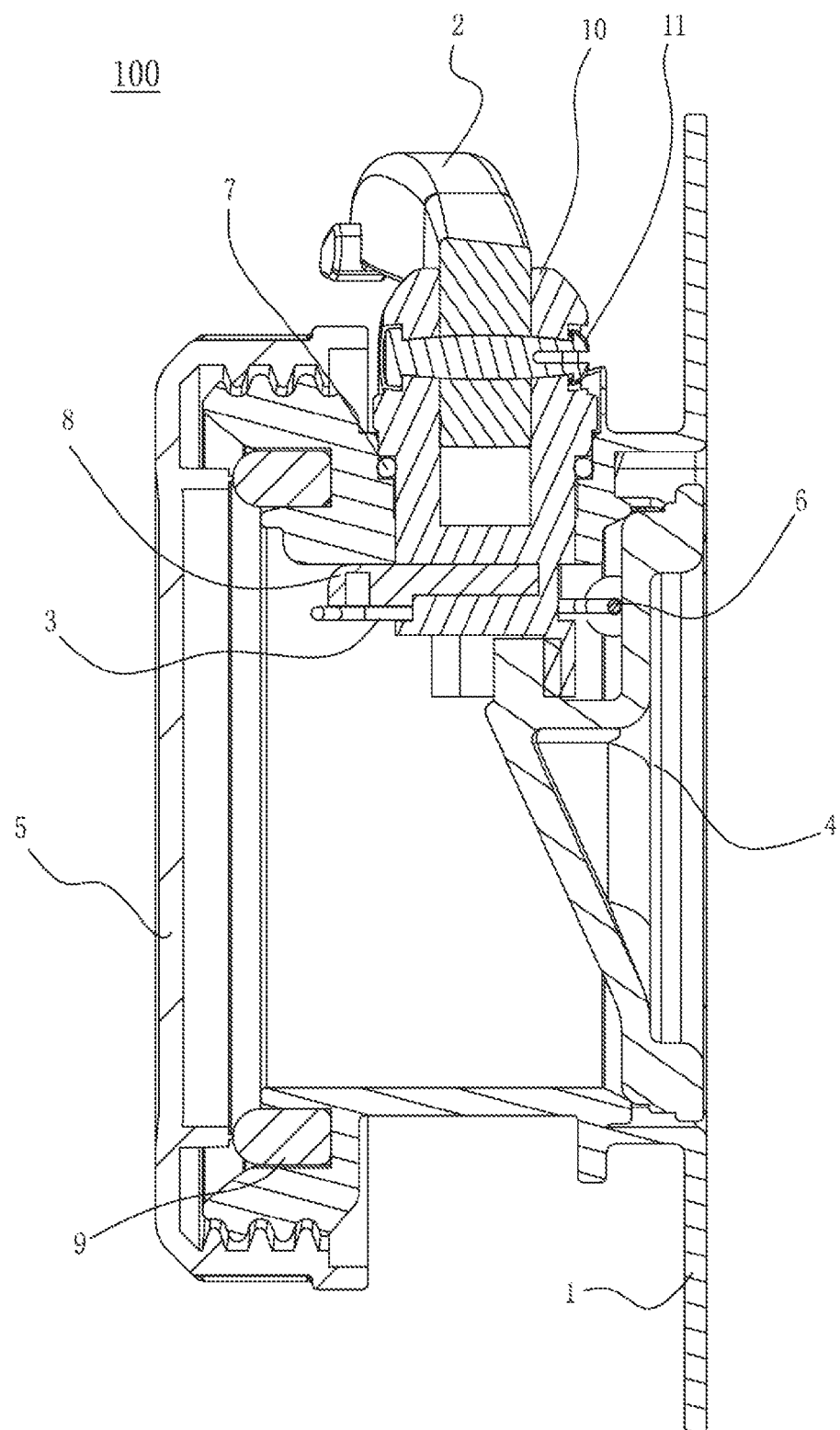
FIG. 8 shows a sectional view of the valve when assembled according to the first embodiment of the present invention, wherein the valve is closed.

FIG. 8 shows a sectional side view of the valve 100 when assembled, wherein the valve is closed. As shown in FIG. 8, the valve stem 10 is partially housed in the valve stem hole 1d of the body 1 and is rotatably held on the valve body 1 by a snap 8. The hinge shafts 411, 412 on the valve core 4 are inserted into the hinge holes 1g, 1h, respectively such that the valve core 4 is rotatable about a central axis of the hinge holes. The valve stem 10 is connected to the valve core 4 through spring wire 3 such that when the valve stem 10 is rotated, the valve stem 10 will drive the spring wire 3 to move which in turn drives the valve core 4 to move, thereby opening or closing the valve core.

Figure 9:
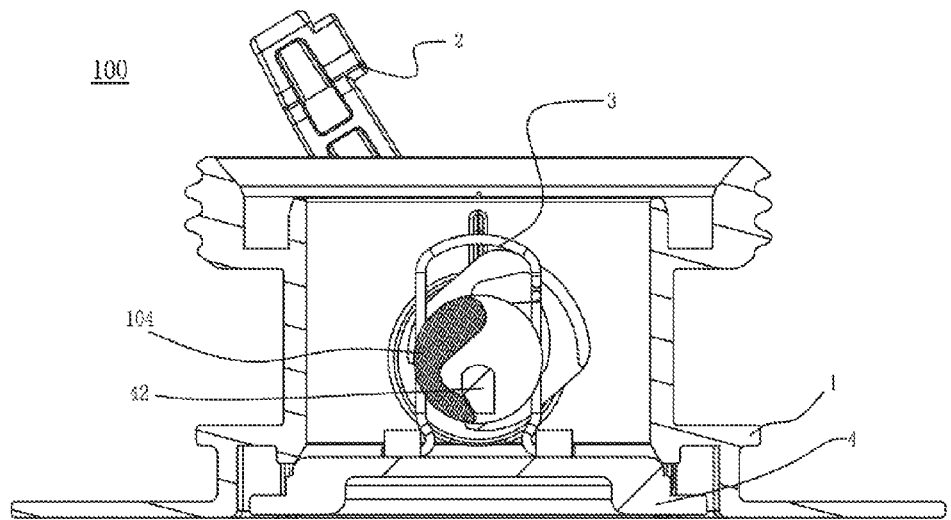
FIG. 9 shows a sectional bottom view of the valve according to the first embodiment of the present invention, wherein the valve is pre-closed.
Figure 10:
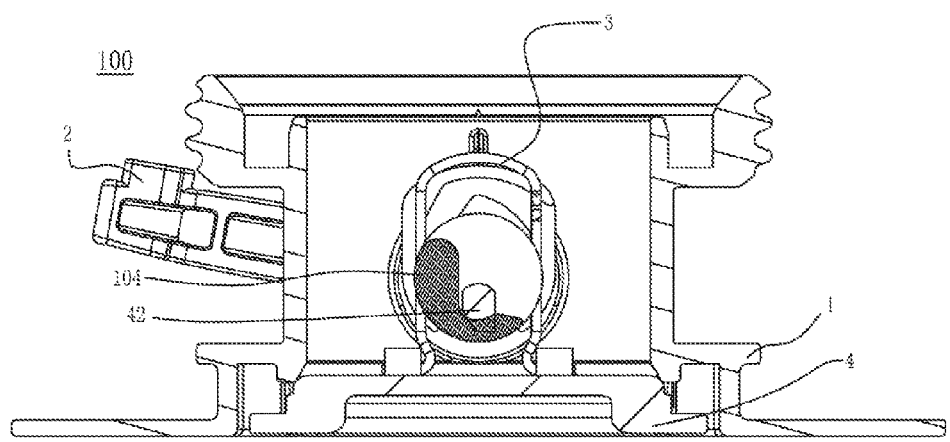
FIG. 10 shows a sectional bottom view of the valve according to the first embodiment of the present invention, wherein the valve is completely closed.

When closing the valve, the valve stem 10 is rotated towards a closed state. The valve stem 10, the guide 8 and the slide 3 are constructed of a motion-transferring mechanism. The slide 3 sliding along the guide 8 will pull the valve 4 towards the valve body 1, so that the valve core 4 is in a pre-closed state, as shown in FIG. 9. The valve body 10 now is not yet fully locked. As the valve stem 10 is further rotated, when the locking column 42 contacts with the start portion 104a of the locking hook 104, the start portion 104a will apply an inward force on the locking column under the effect of the inclined surface of the start portion 104a; when the locking column 42 is pulled to the intermediate portion 104b, a side surface of the locking column 42 is engaged with the terminal portion 104c of the locking hook 104. At this point, the sealing ring 6 is compressed so as to achieve sealing, as shown in FIG. 10. In this case, the locking protrusion 103a on the valve stem 10 moves over the positioning protrusion 1f on the valve body 1 and the stopping projection 102 on the valve stem 10 is lean against the positioning protrusion 1f on the valve body 1, thereby achieving locking.

When opening the valve, the valve stem 10 is rotated reversely such that the locking hook 104 of the valve stem 10 will firstly be disengaged from the locking column 42 of the valve core 4. When the valve stem 10 is further rotated, the valve stein 10, the guide 8 and the slide 3 are constructed of the motion-transferring mechanism such that the slide 3 pushes away the valve core 4 to open the valve core 4 completely. The locking protrusion 103b on the valve stem 10 moves over the positioning protrusion 1e on the valve body and the stopping projection 102 on the valve stem 10 is lean against the positioning protrusion 1e on the valve body 1. At this time, the valve stem is locked.

In the above embodiment, since the valve core is connected to the valve body via a hinge, the valve core can be rotated around the central axis of the hinge to achieve opening/closing of the valve. When opened, there is no stopping member in the fluid channel of the valve body, which allows for a large flow. Besides, the valve can be opened efficiently by setting motion-transferring ration properly between the operating mechanism and the motion-transferring device. For example, the valve can be fully opened and closed with the valve stem being rotated by merely a small angle. Further, adopting a hinge connecting manner provides a valve with simple, compact structure and a low manufacturing cost, being easy to operate, requiring a small torque for opening/closing, opened at a large angle, allowing for a large flow, and easy to be cleaned.

It should be noted that, each member according to the above-described embodiment may have various modifications. For example, the handle and the valve stem may be formed integrally. The hinge connection between the valve core and the valve body can also be implemented as hinge holes provided on the valve core and hinge shafts provided on the valve body or the like.

In addition, the guide and the slide may also have other configurations, provided that: rotating shafts for rotatably connecting to the connecting holes of the valve core are provided on the slide; guiding structures which can be engaged with each other, such as rail and guiding post, are provided on the guide and the slide, respectively; and the guide and the slide can move synchronously with the movement of the valve stem. The rail may be provided on the guide with the guiding post provided on the slide. Alternatively, the rail may be provided on the slide with the guiding post provided on the guide. Also, the guide and the valve stem may be formed integrally.

The preferred embodiments of the present invention have been described in detail above, however, it should be understood that after reading the foregoing teachings of the present invention, those skilled in the art may make various modifications of the present invention or modifications. These equivalents are within the scope of the appended claims.

What is claimed is:

1. A hinged valve, comprising a handle, a valve body, a valve stem, a valve core, sealing rings and a valve cover, said valve body is a housing, wherein the housing is formed with a valve stem hole for partially accommodating the valve stem, and a channel having an inlet and an outlet is formed in the housing, wherein the hinged valve further comprises a guide and a slide for transferring the motion of the valve stem to the valve core;

the valve core is connected to the valve body by means of a hinge such that the valve core can be rotated around a rotation axis of the hinge, wherein a locking column and connecting holes are provided on the valve core;

a locking hook is provided on the bottom end of the valve stem;

a guiding structure is provided on the guide, the guide is further provided with a positioning column and elastic buckles, and a positioning hole is provided on a lower portion of the valve stem above the locking hook, wherein the positioning column on the guide is connected to the positioning hole of the valve stem and the guide is elastically assembled to a body of the valve stem under the effect of the elastic buckles of the guide, such that the guide and the valve stem will move synchronously without motion relative to each other, such that the guide and the valve stem are connected to each other so as to move synchronously without motion relative to each other; and rotating shafts and another guiding structure for engaging with the guiding structure of the guide are provided on the slide, wherein the rotating shafts are respectively connected to the connecting holes and rotatable in the connecting holes such that the rotation of the valve stem will be transferred to the valve core via the slide by the guide and is converted into a rotation of the valve core around the rotation axis of the hinge so as to open or close the valve, and wherein the valve core is locked to the valve body through the locking hook and the locking column when the valve is closed.

2. The valve as claimed in claim 1, wherein the guiding structure of the guide is a guiding slot, and the another guiding structure of the slide is a guiding post, wherein the guiding post is slidable along the guiding slot.

3. The valve as claimed in claim 1, wherein the guide and the valve stem are formed integrally.

4. The valve as claimed in claim 1, wherein the hinge is constructed of hinge shafts provided on the valve core and hinge holes provided on the valve body.

5. The valve as claimed in claim 1, wherein the locking hook is a hook-shaped structure and comprises an start portion, an intermediate portion and a terminal portion, wherein the start portion is an inclined surface functioning as a guider.

6. The valve as claimed in claim 1, wherein two positioning protrusions spaced apart by an angle are provided on an outer wall defining the valve stem hole, and a stopping projection and locking protrusions are integrally protruding from the outer wall of the valve stem at the upper portion thereof, wherein the stopping projection and locking protrusions are respectively engaged with the two positioning protrusions so as to keep the valve open and prevent the valve stem from rotating beyond a predetermined angle.

7. The valve as claimed in claim 1, wherein the valve core has a disc-shaped body and the locking column is provided at a side of the disc-shaped body facing toward the channel, wherein two projections above the locking column are protruded from a side of the valve core, wherein connecting holes for receiving the rotating shafts of the slide are provided in the two projections, respectively.

8. The valve as claimed in claim 1, wherein the guide is an E-shaped member, wherein the elastic buckles are an upper arm and a lower arm of the E-shaped member and the positioning column is a middle arm of the E-shaped member, wherein the guiding slot is provided on a head of the E-shaped member, wherein a positioning step is further provided below the positioning hole, which prevents the guide from moving in an axial direction of the valve stem.

9. The valve as claimed in claim 1, wherein the slide has a substantially U-shaped body, wherein the rotating shafts are provided on the ends of two arms of the U-shaped body, respectively.

\* \* \* \* \*